United States Patent
Druliner

(10) Patent No.: US 7,028,429 B1
(45) Date of Patent: Apr. 18, 2006

(54) DECOY

(76) Inventor: Jim Druliner, 2617 W. Eastwood, Chicago, IL (US) 60625

( * ) Notice: Subject to any disclaimer, the term of this patent is extended or adjusted under 35 U.S.C. 154(b) by 0 days.

(21) Appl. No.: 10/844,368

(22) Filed: May 13, 2004

Related U.S. Application Data

(60) Provisional application No. 60/491,239, filed on Jul. 31, 2003.

(51) Int. Cl.
*A01M 31/06* (2006.01)

(52) U.S. Cl. .............................................. 43/3

(58) Field of Classification Search .............. 43/2, 43/3; D10/59; 40/412; 446/201
See application file for complete search history.

(56) References Cited

U.S. PATENT DOCUMENTS

| | | | | |
|---|---|---|---|---|
| 812,499 | A * | 2/1906 | Johnston | 43/3 |
| 1,727,700 | A * | 9/1929 | Dickson | 446/387 |
| 4,611,421 | A * | 9/1986 | Jacob | 43/3 |
| 4,651,457 | A | 3/1987 | Nelson et al. | 43/3 |
| 4,893,428 | A | 1/1990 | Gagnon, Sr. | 43/3 |
| 4,928,418 | A | 5/1990 | Stelly | 43/3 |
| 5,172,506 | A | 12/1992 | Tiley et al. | 43/3 |
| 6,722,067 | B1 * | 4/2004 | Kennedy et al. | 40/606.19 |
| 2003/0101635 | A1 * | 6/2003 | Fencel et al. | 43/3 |

* cited by examiner

*Primary Examiner*—Teri Pham Luu
*Assistant Examiner*—Kimberly S. Smith
(74) *Attorney, Agent, or Firm*—Patent & Trademark Services, Inc; Joseph H. McGlynn

(57) ABSTRACT

A decoy which has a head separate from the body and which has a spring device which attaches at one end to the ground and which attaches at another end to the head of the decoy to simulate a waterfowl feeding.

7 Claims, 2 Drawing Sheets

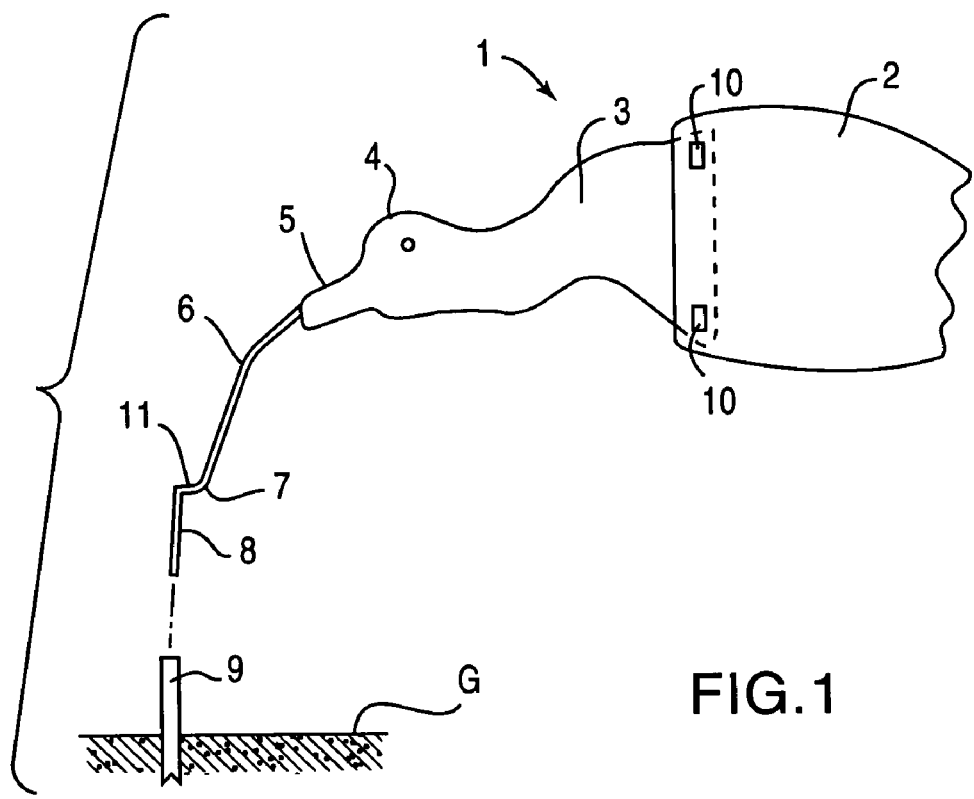
FIG.1
FIG.2
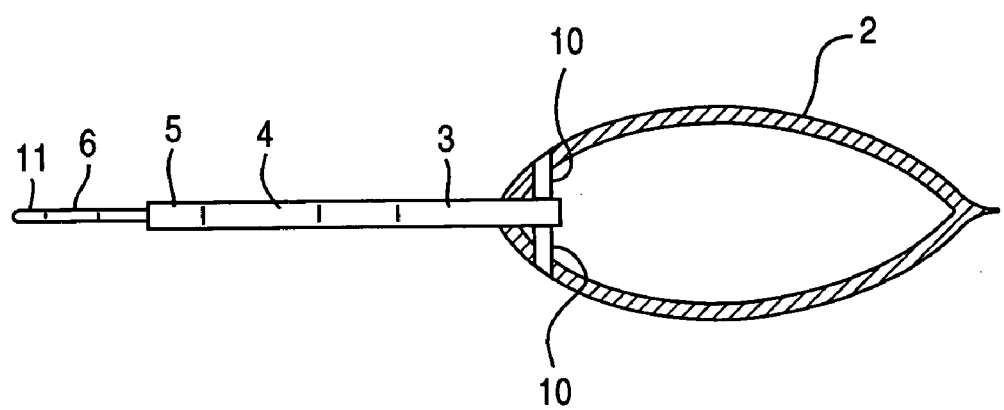

DECOY

This application claims benefit of 60/491,239, filed on Jul. 31, 2003.

BACKGROUND OF THE INVENTION

This invention relates, in general, to decoys, and, in particular, to a decoy which has an up and down movement to simulate a feeding waterfowl.

DESCRIPTION OF THE PRIOR ART

In the prior art various types of decoys have been proposed. For example, U.S. Pat. No. 4,893,428 to Gagnon, Sr. discloses a decoy with a mounting stake mounted in the middle of the decoy.

U.S. Pat. No. 4,651,457 to Nelson et al discloses a weather vane type decoy having a supporting stake mounted to the head of the decoy.

U.S. Pat. No. 5,172,506 to Tiley et al discloses a decoy having a head mounted on top of a wind sock type body.

U.S. Pat. No. 4,928,418 to Stelly discloses an expandable decoy with a wire frame and an expandable body attached to the frame.

SUMMARY OF THE INVENTION

The present invention is directed to a decoy which has a head separate from the body and which has a spring device which attaches at one end to the ground and which attaches at another end to the head of the decoy to simulate a waterfowl feeding.

It is an object of the present invention to provide a new and improved decoy.

It is an object of the present invention to provide a new and improved decoy which is secured to the ground in a way that simulates a waterfowl feeding.

It is an object of the present invention to provide a new and improved decoy which can be easily and quickly placed in position.

These and other objects and advantages of the present invention will be fully apparent from the following description, when taken in connection with the annexed drawings.

BRIEF DESCRIPTION OF THE DRAWINGS

FIG. 1 is a partial side view of the present invention.

FIG. 2 is a cross-sectional top view of the present invention.

DESCRIPTION OF THE PREFERRED EMBODIMENT

Figure 3:
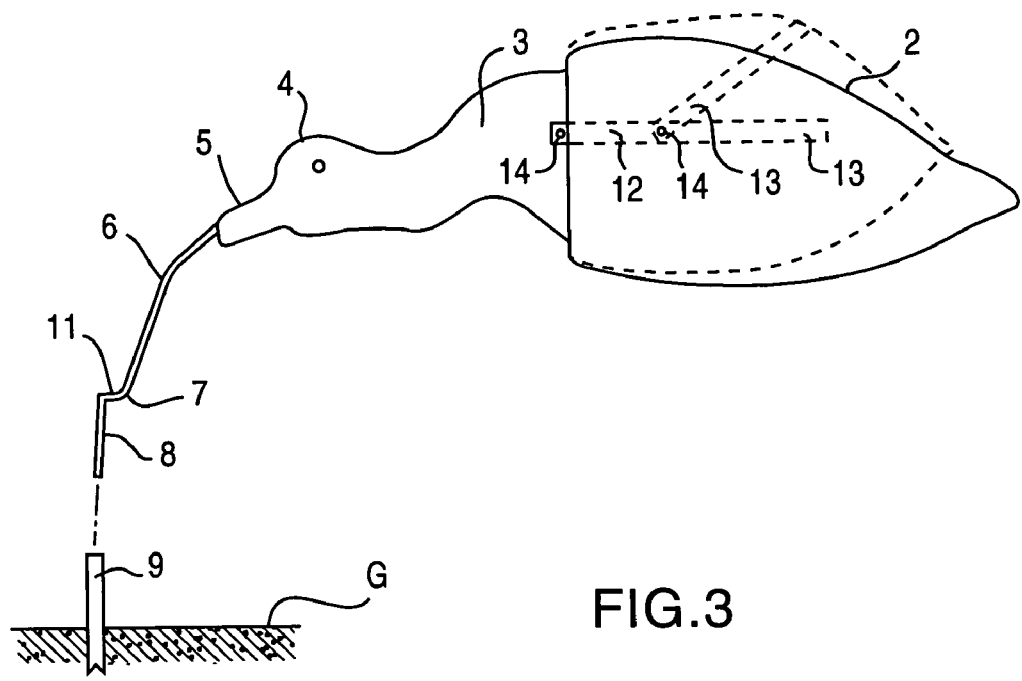
FIG. 3 is a side view of the present invention.

Referring now to the drawings in greater detail, FIG. 1 shows a side view of the decoy 1 of the present invention. The decoy is in the shape of a duck, however, any type of waterfowl could be used without departing from the scope of the invention. The decoy 1 has a bag-like body 2 to which a head 4 and neck 3 are attached. As can be seen from FIG. 2, the body 2 is essentially a hollow bag which will make the decoy lighter than if the body were solid. Also, it makes the decoy easier to clean. The forward part of the body has at least a pair of apertures therethrough which will accept tabs 10 to secure the head 4 and neck 3 to the body. The tabs 10 can be the snap acting kind which will be compressed as the neck 3 is inserted into the body 2 and then snap into the apertures in the body 2 which accept the tabs 10. As an alternative adhesive or bendable tabs could be substituted for the snap acting tabs 10.

A spring steel stake 6, 7, 8, 11 is secured to the bill 5 of the head 4 in any conventional manner such as, but not limited to, a friction fit with a hole in the bill 5. The spring steel stake has a first part 6 which is secured to the bill 5 and is slightly curved down to a second part 7. The part 6 acts as a spring for a purpose to be explained more fully below. The stake at this point flattens horizontally into a third part 11. Joined to the third part 11 is a fourth part 8 which extends vertically from the third part 11. Part 8 is inserted into a hollow tube 9 which is inserted into the ground G. Part 8 is inserted into the tube 9 until horizontal portion 11 hits the top of the tube 9, which will prevent the stake from moving any further into the tube, and which will allow the decoy to rotate around the tube 9 as the wind blows against the body 2. When one end of the stake is attached to the decoy 1 and the other end of the stake is inserted into the tube 9, the decoy will be supported in a free floating position, since the diameter of the tube 9 is larger than the diameter of part 8 of the stake. Also, the part 8 can be inserted directly into the ground G.

Since the stake is attached to the head, and there is no other support for the decoy, the decoy will orient into the wind. This is a desirable attribute for decoys since it will eliminate the need to reset the decoys should the direction of the wind change. Since the bag-like body 2 is larger than the rest of the decoy, as shown in FIG. 2, the wind will hit the larger area of the body and automatically orient the decoy into the wind. The mostly closed design of the front portion of the body 2 will eliminate the need for devices to hold the body open to fill with air as is the case in the wind sock type prior art devices.

In addition to supporting the decoy 1, the spring steel stake 6, 7, 8, 11 serves another purpose. It also allows the decoy to move up and down or bob when the wind hits the body 2. The curved portion 6 acts as a cantilever spring to impart an up and down motion to the decoy. This up and down motion will simulate a feeding waterfowl and will help attract real waterfowl.

As shown in FIG. 3, other changes can be made to make the decoy assume a more natural position when there is no wind. In FIG. 3 a pair of arms 12, 13 have been attached to the neck 3 of the decoy. Plastic rivets 14, or the like, can be used to secure the arm 12 to the neck 3, or the arm 13 to the arm 12. At least the rivet securing the arm 13 to the arm 12 should allow the arms to move relative to each other, and at the same time allow the arms to stay in the position they are placed in. By moving the arm 13 from the horizontal position to a more vertical position, the bag-like body 2 can be made to assume a different position. This could be a more natural looking position and therefore, attract more ducks.

Although the Decoy and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What is claimed is:

1. A decoy for attracting waterfowl, said decoy comprising:
   a body portion,
   a neck portion,
   mounting means for securing said decoy to a support,
   an arm having a first end and a second end,
   said first end of said arm connected to said neck portion,
   said second end of said arm being pivotably connected only to a second arm, and
   said second arm engaging an inside surface of said body portion;
   wherein said body portion can be moved vertically with respect to said neck portion when said decoy is in use.

2. The decoy for attracting waterfowl as claimed in claim 1, wherein said second arm is movable to a plurality of positions with respect to said body portion, and
   wherein an end of said second arm engages said body portion in a different position when said second arm is moved.

3. The decoy for attracting waterfowl as claimed in claim 1, wherein said mounting means secured to said head portion for securing said decoy to a support comprises:
   a wire,
   said wire having a first end and a second end,
   said first end of said wire being secured to said head portion of said decoy, and
   said wire having a first portion extending from said head portion, and
   said wire having a second portion extending at an angle from said first portion and connected to a third portion, and
   said third portion being connected to a support.

4. The decoy for attracting waterfowl as claimed in claim 3, wherein said first portion of said wire is curved.

5. The decoy for attracting waterfowl as claimed in claim 3, wherein said second portion of said wire extends horizontally from said first portion.

6. The decoy for attracting waterfowl as claimed in claim 3, wherein said third portion of said wire extends vertically from said second portion of said wire.

7. The decoy for attracting waterfowl as claimed in claim 3, wherein said third portion of said wire extends into a hollow tube.

* * * * *